US012644983B2

(12) United States Patent　　　(10) Patent No.:　US 12,644,983 B2
Nobbe et al.　　　(45) Date of Patent:　Jun. 2, 2026

(54) METHODS FOR IMPROVING RADAR ANGULAR RESOLUTION BY MOVING NODES IN RESPONSE TO A PROJECTED TARGET PATH, AND NODE FOR THE SAME

(71) Applicant: MatrixSpace, Inc., Burlington, MA (US)

(72) Inventors: Dan William Nobbe, Crystal Lake, IL (US); Matthew T. Kling, Uxbridge, MA (US)

(73) Assignee: MatrixSpace, Inc., Burlington, MA (US)

( * ) Notice: Subject to any disclaimer, the term of this patent is extended or adjusted under 35 U.S.C. 154(b) by 198 days.

(21) Appl. No.: 18/543,372

(22) Filed: Dec. 18, 2023

(65) Prior Publication Data

US 2024/0201367 A1　　Jun. 20, 2024

Related U.S. Application Data

(60) Provisional application No. 63/433,696, filed on Dec. 19, 2022.

(51) Int. Cl.
　*G01S 13/933*　　(2020.01)
　*G01S 7/00*　　(2006.01)
　*G01S 7/03*　　(2006.01)
(52) U.S. Cl.
　CPC ............ *G01S 13/933* (2020.01); *G01S 7/006* (2013.01); *G01S 7/03* (2013.01)
(58) Field of Classification Search
　CPC ........... G01S 7/03; G01S 7/006; G01S 13/933

USPC .......................................................... 342/59
See application file for complete search history.

(56) References Cited

U.S. PATENT DOCUMENTS

| | | | |
|---|---|---|---|
| 6,218,979 B1 * | 4/2001 | Barnes ................. | H01Q 3/2682 |
| | | | 342/28 |
| 11,002,819 B2 * | 5/2021 | Wittenberg ........... | G01S 13/878 |
| 2001/0035837 A1 * | 11/2001 | Fullerton ................ | G01S 7/003 |
| | | | 342/21 |
| 2009/0174591 A1 * | 7/2009 | Cornic .................. | G01S 13/584 |
| | | | 342/29 |
| 2015/0134150 A1 * | 5/2015 | Farjon ..................... | G08G 5/55 |
| | | | 701/3 |
| 2017/0307759 A1 * | 10/2017 | Pei .......................... | G01S 17/10 |
| 2022/0413113 A1 * | 12/2022 | Fluhler ..................... | G01S 7/03 |

* cited by examiner

*Primary Examiner* — Brady W Frazier
(74) *Attorney, Agent, or Firm* — Ryan, Mason & Lewis, LLP

(57) ABSTRACT

Systems and methods are provided for improving radar angular resolution. Radar operations in one or more nodes may be controlled, with the controlling including applying one or more measures for improving radar angular resolution for at least one radar deployed on one of the one or more nodes, with the improving of radar angular resolution entailing increasing radar angular resolution for the at least one radar relative to an identical radar operated in identical conditions. The one or more measures comprise fusing radar data with data from other data sources, movement of radar platforms, use of multiple radars for triangulation, use of multiple nodes moving in formation, and creating features or distortions of antenna beams. The one or more nodes may be aerial drones.

22 Claims, 8 Drawing Sheets

METHODS FOR IMPROVING RADAR ANGULAR RESOLUTION BY MOVING NODES IN RESPONSE TO A PROJECTED TARGET PATH, AND NODE FOR THE SAME

CROSS REFERENCE TO RELATED APPLICATIONS

This application is a Non-Provisional Patent Application of U.S. Provisional Patent Application No. 63/433,696 entitled "Methods And Systems For Improving Radar Angular Resolution" filed Dec. 19, 2022, which is herein incorporated by reference in its entirety.

TECHNICAL FIELD

Aspects of the present disclosure relate to communication solutions. More specifically, various implementations of the present disclosure relate to methods and systems for radar angular resolution.

BACKGROUND

Limitations and disadvantages of conventional and traditional solutions for operating radar and similar detection devices, especially when in operating a radio frequency (RF) communication network in a dynamic, and sometimes hostile, RF environment, will become apparent to one of skill in the art, through comparison of such systems with some aspects of the present disclosure as set forth in the remainder of the present application with reference to the drawings.

BRIEF SUMMARY

System and methods are provided for improving radar angular resolution, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
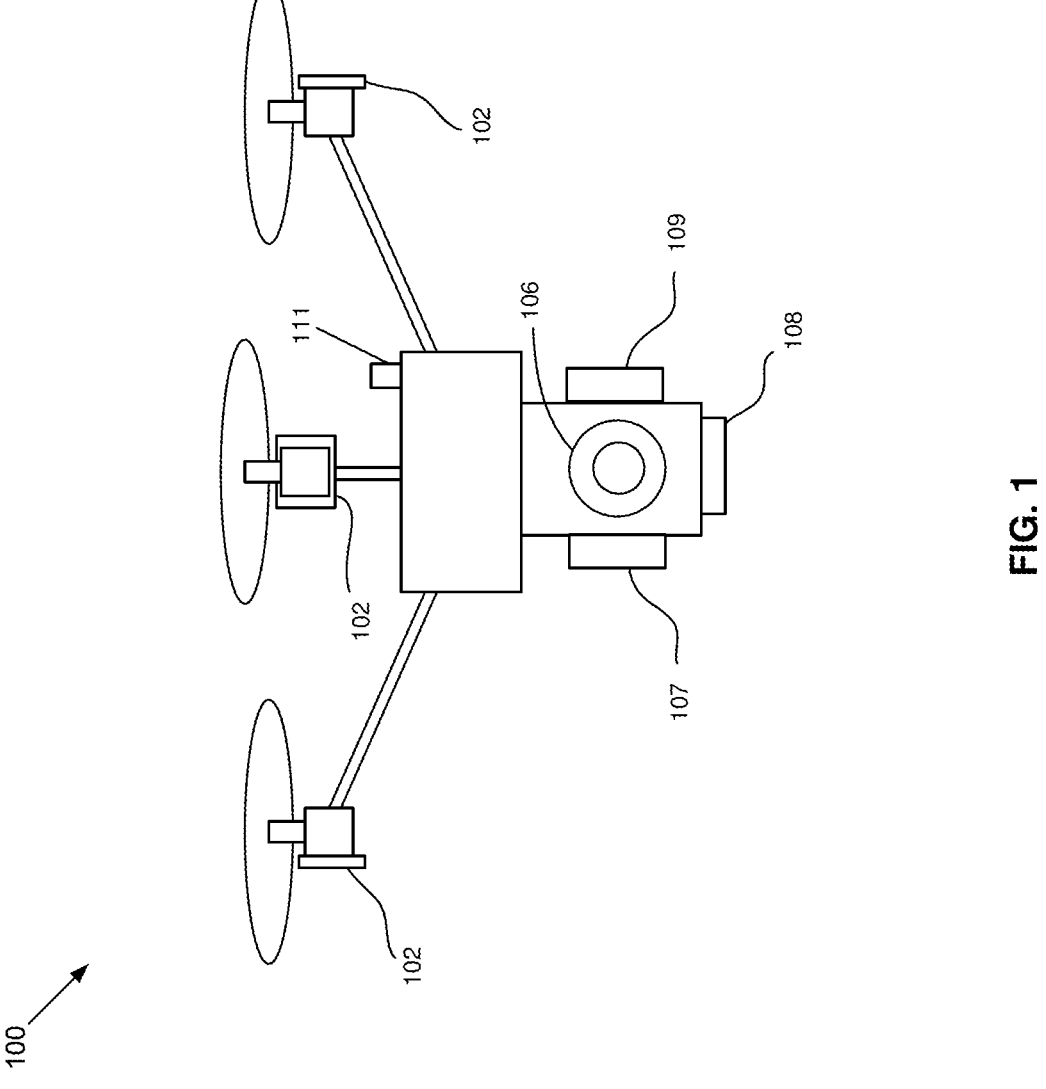
FIG. 1 shows an aerial drone that may be utilized in accordance with an example embodiment of the disclosure.

Communications networks involve tradeoffs in range, bandwidth, power, and noise immunity. A mesh network is a form of network where the distance covered can be extended by hopping communications through intermediate nodes. Instead of hopping along a single path, a mesh topology allows a communication link to be set up on any of multiple paths through the mesh. A mesh routing protocol allows a link to be set up between any two nodes over any available path through the mesh. If a link is broken because of interference or loss of a node, the protocol establishes a new route through the mesh. Accordingly, a mesh network is resilient and self-healing.

Existing mesh network implementations use nodes that are largely static or operate with omnidirectional antennas, and operate at relatively lower frequencies. The present disclosure contemplates a mesh network of fixed or highly mobile nodes, with a preferred embodiment that operates as a swarm of aerial nodes, where the mesh may choose paths that reject interference based on directional properties of the node antennas and their transmission and reception. In addition, the network is implemented with millimeter (mm) wave radios. Millimeter wave is high frequency, high-bandwidth, and thus offers higher data rates, than Wi-Fi bands. The mm wave spectrum is also less crowded with competing applications, especially above the highest frequency cellular bands. Another advantage of mm wave is that antenna size decreases with increasing frequency, allowing for more sophisticated, higher gain antennas in smaller, lighter weight packages. Phased array antennas allow for increased gain, and in particular, by adjusting the phase and amplitude of each element in the array, the antenna gain can be adjusted and steered so that the antenna is highly directional and rapidly adjustable, an important feature for the highly dynamic nature of the disclosed mesh network.

In a mesh network of nodes with omnidirectional antennas, an interfering RF emitter will continue to interfere with nearby nodes no matter how the node is oriented relative to the interferer. Even if the node is mobile, changing the orientation of the node or minor adjustments in location are unlikely to alleviate the interference. However, by using a mesh network with directional antennas, such as phased array antennas, for example, nodes that are being interfered with may steer their antennas' beam patterns towards a node that is in a direction with less interference, use or select a different route through the mesh network that uses nodes whose antenna orientation is not aligned with the source of interference, and/or adjust the beam pattern so that a notch or null in the beam pattern is aimed at the interferer while only losing a slight amount of gain relative to peak gain. Nearby nodes that are within range of the interferer may also make these adjustments to their beam pattern as well. This may be done at high speed, with physically moving the node in space maintained as another option.

FIG. 1 shows an aerial drone that may be utilized in an accordance with an example embodiment of the disclosure. Shown in FIG. 1 is drone 100. The drone 100 is not crewed, and is preferably lightweight with a useful payload on the order of 10 pounds. The drone is equipped with directional, planar phased array antennas 102. While FIG. 1 only has three motor/blade mechanisms visible, there is a fourth directly behind the front one, although a higher number may be utilized, such as six, eight, or twelve for example. The phased array antennas 102 can be mounted on any convenient surface on the drone to achieve the desired coverage based on the capability of the array, as further explained herein.

The drone is also equipped with sensors for collecting information. In the embodiment shown, the sensors include an optical imager 106, an infrared sensor 107, a LIDAR imager 108, an acoustic sensor 109, radar, and software-defined radio (SDR) for RF spectral sensing. The drone may comprise additional hardware for guidance, including a satellite position system antenna 111 and an inertial "dead reckoning" accelerometer and magnetic compass (not shown). The phased array antennas may be of any size, but are shown as 4×4 arrays in this embodiment, with an element size designed for the millimeter wave range, generally in the range of 10 to 200 GHZ. While any operating frequency could be chosen, the preferred embodiment operates at 24 GHz. In this mode of operation, line of sight communication of the radio links described herein is reasonable out to a single digit mile radius, with link distances typically under one mile.

Altitude is an important parameter for locating the drone in space, and essential for avoiding terrain. The drone preferably employs a combination of techniques for determining and maintaining altitude. Laser range finding, such as LIDAR, provides fast and accurate altitude information provided visibility is good. An on-board pressure altimeter provides a secondary reference, and the phased array antennas 102 may be used to provide ranging information to points on the ground using trigonometry if the ground surface is sufficiently reflective. Satellite provided GPS may also provide an estimate of altitude above the surface of the earth. Combining all these sources and comparing them to an on board reference map of the area of operation provides an accurate assessment of current altitude and contributes to a refined assessment of the drone's absolute position in space, further described below.

Figure 2:
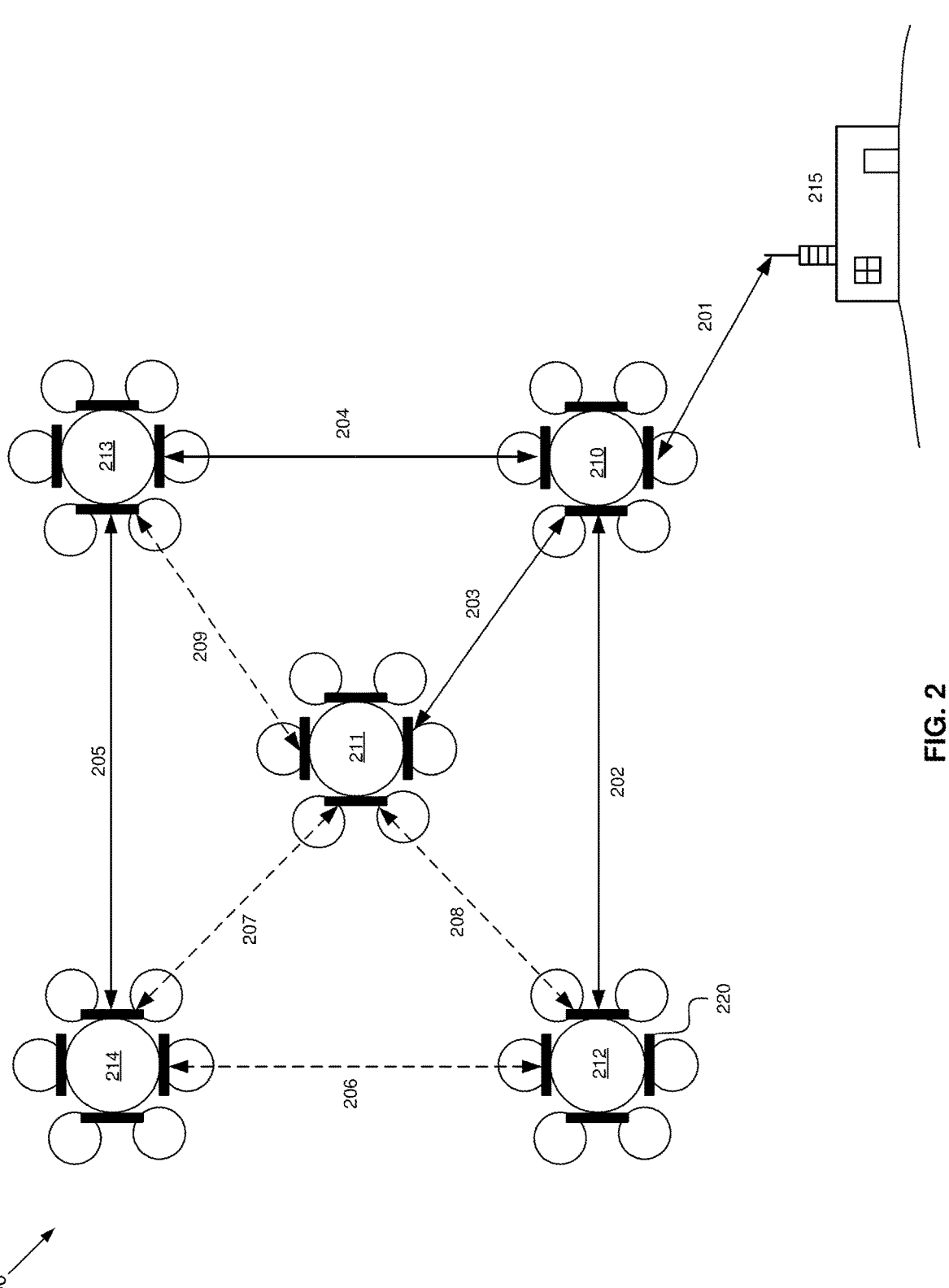
FIG. 2 shows a drone swarm that has formed a mesh network.

FIG. 2 shows a network 200 of aerial drones 210-214 forming a mesh network of links 201-209. Each of the drones 210-214 may comprise one or more phased array antennas 220, where the number of antenna arrays may ensure full 360° coverage. The network has a root at a ground or base station 215, which is shown as a static location but could also itself, be mobile. Dashed line links 206-209 represent alternate links between drones that are not active. Each drone acts as node in the network. It is not required that all nodes operate at the same frequency, and to avoid interference between nodes that are lined up such that a third further node is in the peak energy beam of a radio link between a first and second node, the network may employ several alternate neighboring frequencies.

Illustrated in FIG. 2 for illustrative purposes is a drone swarm of unmanned aerial vehicles or drones. Each drone in the swarm is also a communications node and is equipped with one or more phased array, electrically steerable antennas and a transceiver operating in the millimeter wave region. Each drone may also be equipped with one or more sensors, such as optical, LIDAR, thermal, or acoustic sensors. The drones carry an on-board processor and memory for controlling the drone's movements, operating the sensors, and managing the transceiver. The drones also carry antennas and a processor for determining position based on satellite data (e.g., Global Positioning System (GPS) or the like) and optionally an on-board inertial and magnetic (compass) sensor. The drones communicate with each other to form a mesh network of communication nodes with an RF link back to a root node, base station, or other target node in the network. The nodes respond to interference from jammers and obstacles by finding new paths through the mesh, steering the millimeter wave beam, re-positioning, or a combination of these techniques.

Path loss of a radio link increases proportional to the square of frequency. For example, going from 2.4 GHz which is roughly a common frequency for cell phones and 2.4 GHz Wi-Fi to 24 GHz would result in a path loss that is 100 times higher, or 20 dB. Going from 2.4 GHz to 80 GHz would have a 30 dB increase in path loss. In a free space propagation condition, the path loss increases by 20 dB for every decade of distance. Therefore, going from 2.4 GHz to 24 GHz would reduce the link distance by a factor of 10, and the link distance for an 80 GHz link would decrease by a factor of 33. However, high frequencies have the benefit of very wide bandwidths and thus faster data rates. Additionally, the size of the antenna decreases with frequency (wavelength), enabling the use of more complex, higher gain antennae to combat the increase in path loss. Higher gain results from focusing the energy, thereby resulting in highly directional antennas.

The phased array antenna consists of numerous antenna that have their amplitude and phase adjusted to steer the beam by adjusting summation and cancellation of signals from various directions. The focusing of the energy, often in both azimuth and elevation, creates a higher gain antenna. However, the very focused beam is preferably pointed in the right direction to facilitate communication. Additionally, the focusing of the beam means the transmission/reception in directions away from the main beam is attenuated, which may enable the avoidance of interference.

Furthermore, the phased antenna arrays may help with isolation of communication channels such as transmitting in one direction and receiving in another. Phased array antennae utilize software to control the gain/phase of each antenna element for steering of the beam, where the system is aware of which direction to steer the beam. The beams may be steered by knowledge of relative GPS locations or drone formation which may be known based on a flight plan or shared over a communications link. The beams may also be steered by scanning the beam and/or with closed-loop tracking. One typical implementation of a phased array antenna uses a planar array of patch antenna elements. This has the advantage of being flat and thus can fit well onto an aircraft without significant size and aerodynamic implications.

Figure 3:
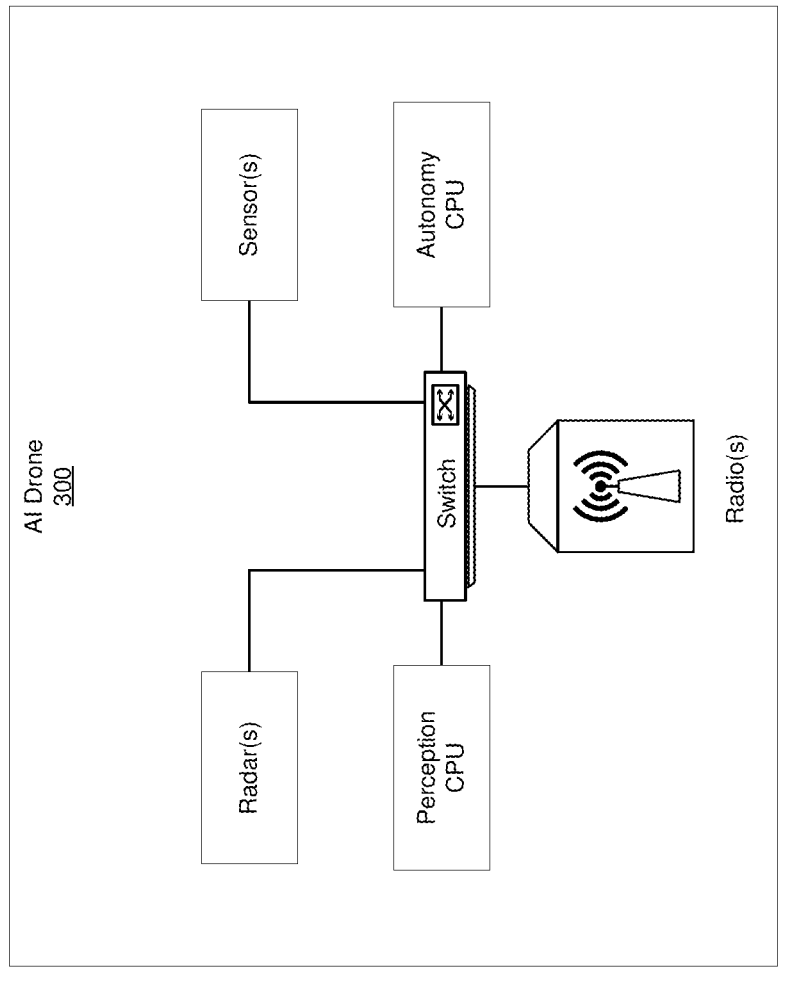
FIG. 3 shows an example drone that may be configured for improving radar angular resolution in accordance with an example embodiment of the disclosure.

FIG. 3 shows an example drone that may be configured for improving radar angular resolution in accordance with an example embodiment of the disclosure. Shown in FIG. 3 is an aerial drone 300 (as described herein).

The drone 300 may comprise suitable circuitry and other components (e.g., hardware or otherwise) to facilitate operation in accordance with the present disclosure. For example, the drone 300 may comprise radar(s), other sensor(s), communication module(s), and processors (e.g., central processing unit (CPU) processors, graphics processing unit (GPU) processors, etc.). In some instances, the drone 300 may be configured to facilitate or support use of advanced computing/processing based operations, such as artificial intelligence (AI) based operations. In this regard, circuitry and other components (e.g., hardware or otherwise) embedded in (or otherwise made available to) the drone 300 may be configured to support various advanced computing based tasks, such as real-time artificial intelligence (AI) computing/processing and data analytics, which may be used in conjunction with radar angular resolution related functions.

For example, as shown in FIG. 3, the drone 300 comprises a perception processor/circuit (or CPU), an autonomy processor/circuit (or CPU), radio(s), radar(s) and other sensor(s) for obtaining sensory related data, and a switch for facilitating interactions among the various elements of the drone 300. The perception processor/circuit (or CPU) and the autonomy processor/circuit may be configured to facilitate and support, inter alia, AI based sensing, data fusing, and data sharing functions, as described herein. The radio(s) may be configured for supporting communications by the drone 300, such as, e.g., with other AI drones and/or other network elements within a mesh network comprising the drone 300. The disclosure is not limited to particular type of radios, and various types may be used so long as suitable for operation in drone-based environment. In an example implementation, mesh based radios that may be optimized for supporting forming and operating mesh networks of drones are used. The radars may be configured to provide radar based detection, using known radar detection technique. The sensors may be configured to obtain sensory data that may augment radar based data. The sensors may be configured to support, e.g., automatic dependent surveillance-broadcast (ADS-B) based sensory, camera feed, thermal imaging, etc.

In some instances, drones such as the drone 300 may be configured for improved data communications in drone based mesh networks. As noted, the drone 300 may incorporate advanced radios such as one or more radar/communication modules (e.g., mesh based radios), which may support improved data communication. For example, the radar/communication module(s) may support high-speed long-range data (e.g., >200 Mbps up to 1 km), and may have large field of view (e.g., 120° in azimuth and elevation). The radar/communication module(s) may support use of secure data link(s) (e.g., with AES-256 encryption).

In some instances, drones such as the drone 300 may be configured to provide and/or support use of local high bandwidth mesh to enable the drone to connect to other drones and/or network devices. Such local mesh may allow for connecting to drones, fixed sites (e.g., sensor(s) with radios), police cruiser, sensors, etc. For example, mesh connectivity may be provided using 24 GHz phased array, which may allow for communication at, for example, 400 Mbps at 600 m, 200 Mbps at 1 km, and/or 2 Mbps at 20 km. Local device connectivity may be provided using 802.11n dual band, which may allow up to 10 Wi-Fi users (e.g., at 433 Mbps), and/or via wired Ethernet for expanded users. Such mesh connectivity may be suitable for various use applications, such as distributed sensor networks, sensor fusion applications, etc.

In some instances, drones such as the drone 300 may be configured to form and/or operate within a sensor mesh. In such instances, some of the drones may comprise high performance embedded CPU and GPU processor(s) for use in data processing, particularly in conjunction with handling processing and fusing gather sensory data.

In some instances, drones such as the drone 300 may be configured to support various advanced computing based tasks, such as real-time artificial intelligence (AI) and data analytics, which may be used in conjunction with radar angular resolution related functions. In this regard, the drone 300 may be configured to provide software defined artificial intelligence (AI) sensing and autonomous responses. This may be particularly possible and/or optimized in conjunction with the radar angular resolution related functions. In this regard, such AI based solution may include and/or entail use of AI sensing, AI autonomy, and AI cloud services. With respect to AI sensing, data acquisition may be performed using advanced (e.g., mesh based) radars/radios. In this regard, formed RF meshes may enable new levels of data sharing for distributed sensing. Such radars may be optimized for drones or handheld devices. AI software may fuse optical and radar (data), such as using AI deep learning. The software may integrate data from 3rd party optical, LIDAR, thermal/IR and other sources as needed. Sensors may be handheld, ground based, and/or deployed on drones. The implementation of the disclosed software and/or sensing enables multiple object classification & tracking, even in foggy or smoky conditions.

Artificial intelligence (AI) Autonomy may be utilized when acting on acquired data. Sensors, people, vehicles and drones may coordinate data in real-time through RF mesh network. Autonomy software may be used to enable and ensure autonomous drone response and provide AI based assistance to operators. This may allow for multiple object classification and tracking, even in low visibility (e.g., foggy or smoky) conditions. Automated drones may extend sensing over distance and rapidly inspect areas of interest. This may allow for intelligent detect and avoid, or detect and track navigation. In some instances, sensor data may be rendered into detailed three-dimensional (3D) models (e.g., terrain, structures, areas of interest, etc.). The use of such service may also allow for detecting safety hazards (e.g., in structures, terrain, certain locations, etc.), and/or detecting safety/security issues. In some instances, open architecture may be used/supported to enable running or incorporate applications from different sources (e.g., combining provider's proprietary neural networks with user's and/or 3rd party's AI applications).

In some instances, drones such as the drone 300 may be configured for operation within network arrangements configured for other advanced and/or specialized services, such as, e.g., enabling enterprises-scale deployment of aerial vehicles, ground vehicles, fixed sensors, and more, interoperating with any existing networks using intelligent routing at the edge, and/or securing data from end-to-end using fully encrypted links (AES-256).

In accordance with the present disclosure, networks comprising drones such as the drone 300 may be configured for supporting improved radar angular resolution and overall target location ability. Overall target location ability may be improved by, e.g., fusing of radar based data with other sources (e.g., optical or the like). The improvement related measures or techniques may be implemented via a single platform or multiple platforms. In this regard, single platform based improvement may comprise one or more of: moving the platform for multiple observations, use of use of autonomous movement, use of advanced/optimized processing (e.g., artificial intelligence (AI) based processing), classifying objects (e.g., for optimized detection), sharing of information with other nodes (e.g., other drones, other nodes, ground stations, the cloud, etc.), sharing of information within a mesh (comprising plurality of similar platforms), and the like. When moving the platform for multiple observations, information such as location, heading, beam, etc. may be obtained and/or recorded for each observation point. In this regard, location and heading information may be obtained using suitable sensory techniques, such as global positioning (e.g., GPS), inertial measurement unit (IMU) based sensing, and the like. Multiple platforms based improvement may be implemented via a plurality of platforms (e.g., combination of one or more of drones, non-drone mobile nodes, fixed nodes, etc.). In this regard, in some instances the single platform based improvement techniques as described herein may be applied at one or more of the multiple platforms utilized for multiple platforms based improvement. Further, multiple platforms based improvement may comprise one or more of: simultaneous or near simultaneous use of at least some of the multiple platforms, autonomous control of at least some of the multiple platforms, coordinated operation of other platforms, flying drones in formation, moving drones for improved location ability, use of passive detection, use of active and/or passive detection from drone to drone. The simultaneous or near simultaneous use of platforms may comprise and/or entail coordinating (and thus sharing information relating to) such operation parameters as frequency, time, code, space related parameters, or combinations thereof. Passive detection may comprise (or entail) utilizing coded chirps, and entail selecting or setting such parameters as frequency and time related parameters. Coordinated operation of other platforms may comprise, for example, having one node alerting one or more other nodes to request observation and/or coordination of actions by the one or more other nodes. This may comprise or entail sharing or coordinating such information as location(s), target, beam steering, etc. Implementations incorporating use of the improved radar angular resolution and overall target location ability as described herein may have various practical applications—e.g., in drone navigation/detection, in security solutions, in ground based perimeter, in ground vehicle based solutions, in aviation based solutions, in marine based solutions, in golfing and other sports, in local air traffic solutions. Use of such measures or techniques in improving radar angular resolution, and example use cases based thereon, are described in more detail below.

Figure 4:
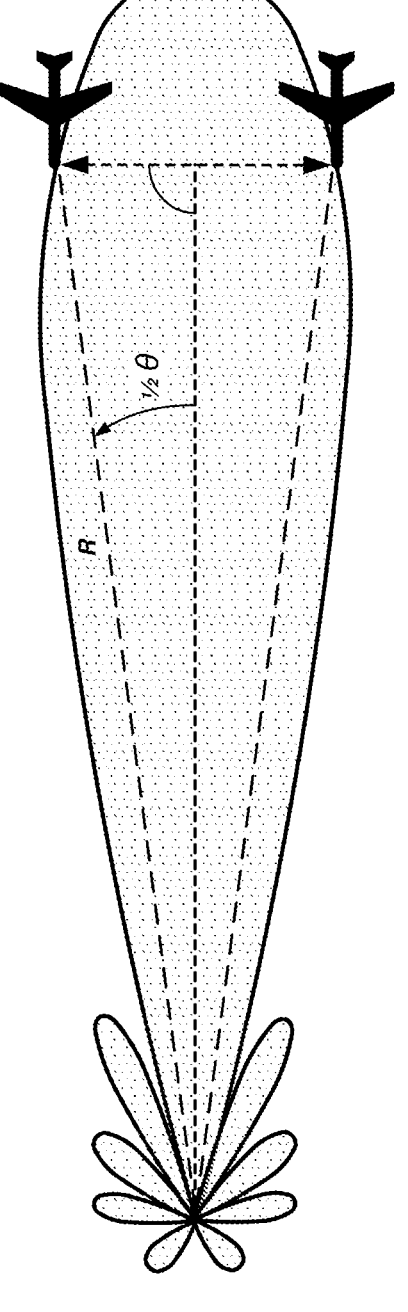
FIG. 4 shows an example use of radar for detection ranging.
Figure 4:

FIG. 4 shows an example use 400 of radar for detection ranging. In this regard, radar provides numerous benefits including good range and range resolution, radar angular resolution, the ability to resolve targets at night, in fog and bad weather, and the ability to provide additional information such as velocity.

Performance attributes typically relate to antenna size, radio power and performance, bandwidth, waveform processing, and similar physics-based tradeoffs. Radar angular resolution is another performance parameter that is pertinent to overall performance of radars. In this regard, radar angular resolution quantifies the limits in radar's ability to distinguish between different objects based on the angle between direct beams or lines to these objects from the radar. In other words, radar angular resolution may represent the smallest angle between two objects at particular range from the radar where the radar may still be capable of identifying these objects as separate objects. In the example use case illustrated in FIG. 4, two targets (e.g., planes) are detected using radar beam(s), with information relating to the detection including range (R) to each plane, and angle ($\theta$) between the two direct lines from the radar to the planes. Radar angular resolution is typically dependent on beamwidth of antenna—e.g., typically relates to the −3 dB beamwidth of the antenna. In this regard, radar angular resolution relates to the beamwidth of the antenna as a starting point. In some instances, when trying to locate an object in space using a radar, range resolution may be better than the spatial resolution provided by the angular resolution at that range. This may be particularly the case at longer ranges and/or wider beamwidth radars. In this regard, with reference to the use case scenario illustrated in FIG. 4, range resolution may correspond to the length of the line between the two objects (e.g., planes) in FIG. 4. That line is equal to 2R*sin($\theta$/2). Angular resolution may not only be set based on the beamwidth, but may also be based on a variety of other techniques as well. In this regard, other techniques may be used to improve the resolution to better than the beamwidth. In the example use case shown in FIG. 4, the two planes are each at the −3 dB points on the beam and thus not resolved—that is, there may not be sufficient radar angular resolution to distinguish between the two planes. Therefore, improving radar angular resolution is desirable.

Beamwidth relates to the size of the antenna (e.g., a parabolic antenna in the example use case illustrated in FIG. 4), with beamwidth (BW) being determined using the formula: BW=70*$\lambda$/D, where D is the diameter of the antenna and A is the transmitted wavelength. The beamwidth of the antenna also relates to the gain or more appropriately the directivity of the antenna, where gain increases as the antenna size increases. Thus, a radar system may realize improved range and radar angular resolution with a larger antenna. However, there are many cases where the size of the antenna is limited, such as based on size of the intended host platform as would be the case with aerial drones. Accordingly, in implementations based on the present disclosure various measures may be used to improve the radar angular resolution of radars used in aerial drones. Example measures may include fusing radar data with other data (e.g., optical data), moving the radar platform, use of multiple radar systems for triangulation, use of multiple drones flown in formation, creating features or distortions of the antenna beam, etc. In various implementations, one or more of such measures may be used to improve radar angular resolution. While various implementations described herein the host platform is a drone, the disclosure is not so limited, and as such host platform may be alternate platform, such as a ground vehicle or ground installation. In this regard, examples of the ground installation would be a deployable or fixed mount sensor on a golf course or other athletic event, for example. Also, some implementations may comprise a set of ground nodes that are used to observe a certain region such as a local air traffic monitor or perimeter security system. Nonetheless, host platform needs to be mobile in the case that a single radar platform is being moved to improve the location accuracy. In some instances, a combination of platforms may be used e.g., one or more drones operating in combination with one or more ground stations.

For example, in implementations where radar data are fused with other data, such as optical data, a radar system may be able to indicate an object at a distance in a certain area (within the beamwidth) well before an optical system may locate a target. The target may show up as a single pixel or small number of pixels that are difficult to distinguish in an optical image. However, if the system is configured to determine that there is an object in a certain region, the image processing may be optimized to locate the target. In some instances, the radar system may be configured to identify a sub-image described or bounded by the radar beamwidth for further image processing. Such improvement may be especially useful on a platform such as drone, particularly for such functions as sensing and avoidance. Nonetheless, the utility of such improvement is not limited to drones and drone based implementations, and may also be useful in other types of implementations, such as in automotive based implementations. In this regard, the automotive environment may be a high clutter environment and typically short range radar are used, and as such improving radar angular resolution would result in improved overall performance.

In some instances, an alternative approach may be used, with radar data being used for range with optics being used for location. In this regard, optical pixel may adequately determine location, but it may be hard to determine range with an optical image. Thus, optical detection may be used to filter radar data—e.g., remove false alarms in radar data. In other words, a process based on such approach includes detecting with optical image first, then using radar data for ranging. This approach "fuses" data from radar systems and optical systems to enhance detection capabilities of the system.

In some instances, laser imaging, detection, and ranging (LIDAR) are used to provide additional data for use in combination with radar data. In this regard, LIDAR may provide a dense point cloud where radar (using angle of arrival) only gives target information (angle and distance) for targets above a certain threshold.

Figure 5:
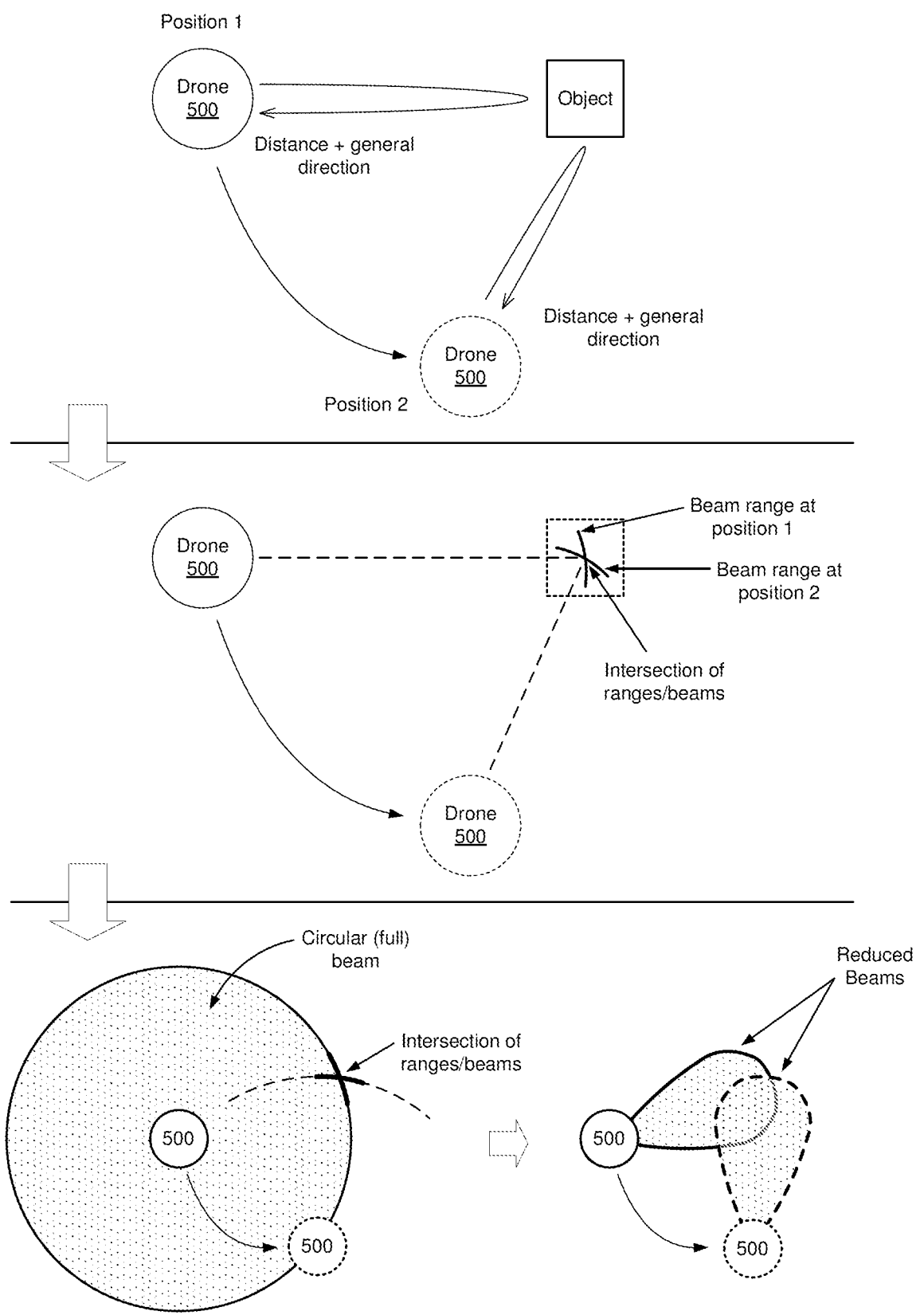
FIG. 5 shows use of movement of radar platforms for improving radar angular resolution.

FIG. 5 shows use of movement of radar platforms for improving radar angular resolution. Shown in FIG. 5 is a drone 500 implemented as an aerial drone as described herein, although the principles described may be applicable to other radar-enabled vehicles or platforms.

The drone 500 may be configured for improving radar angular resolution, particularly based on use of movement of the radar system. In this regard, drone 500 may comprise one or more radars for use in conjunction with operations of the drone 500. As noted, improving radar angular resolution, particularly for radars deployed on relatively small platforms such as drones, is desirable as it allows for compensating for the limitations resulting from small size of the radar that deployment on such platforms necessitates. One mechanism for improving radar angular resolution may entail moving the radar system.

In this regard, the radar system (e.g., a radar on a drone) may be moved, such as by moving the radar platform (e.g., by moving drone 500) to provide different viewpoints (e.g., corresponding to position 1 and position 2 as shown in FIG. 5), and then triangulate location of a particular target. The drone 500 may use the radar to, e.g., detect targets (e.g., the object shown in FIG. 5), at a precise distance, but over a broad angle. The drone 500 then moves and again detects the target with precise distance and broad angle. The position of the target may be determined more precisely using the multiple reading, such as by triangulation—e.g., based on intersection between the beams (or range thereof) as used from the different positions. This is particularly the case in instances where the range resolution is better than the spatial resolution at a certain distance that the angular resolution may provide.

In some instances, the triangulation based information may be used in conjunction with data from other sources to obtain even more accurate positioning information. For example, where the drone 500 is able to obtain (e.g., using sensors embedded into the drone, or from external sources) the coordinates (e.g., GPS based coordinates) from both observation points and the range from both observation points, the target may be located in 3-dimensions (3D) on a circle. The sensors may be GPS sensors configured to obtain the coordinates based on GPS signals. Alternatively, inertial measurement unit (IMU) sensors may be used. The disclosure is not limited to use of data of other sources, however. For example, using a third location could resolve the target location in 3D. In this regard, use of two locations results in intersecting spheres which produces a circle, and many of the points on the circle may be discarded, such as based on physics (e.g., not below ground) and/or based on known/ assumed parameters. The addition of a third observation allows the intersection to be reduced to a point. The locations for the observations may be separated in one direction (e.g., one of X, Y, Z directions), or may be combinations of all directions. The algorithm may be optimized to choose locations. Using the (broad) angles of the beams for the observation may help to reduce the circle to an arc segment, as illustrated in FIG. 5.

In some instances, the drone may be configured to perform the steps for using radar platform movement autonomously. For example, the drone may be configured to choose observation points, such as based on anticipated location, but may also factor in other parameters or information, such as information relating to the environment (e.g., buildings and obstructions) at or near these observation points. In some instances, the drone may be configured for continued observation, e.g., as a drone moves around an object. As noted, this approach is not limited to using two observation points, and as such in some instances combination of many observation points may be used, for improved sensing and thereby avoidance. In some instances, the drone may be configured to perform additional tasks—e.g., classifying object, determining location, sharing information with one or more drones that comprise the drone, a swarm of drones, etc.

The use of radar platform movement—that is, use of multiple observation points—may have some limitations, as it may be too slow if the target is moving. Nonetheless, this approach/mechanism may be very practical and useful in detecting fixed objects and mapping areas.

Figure 6:
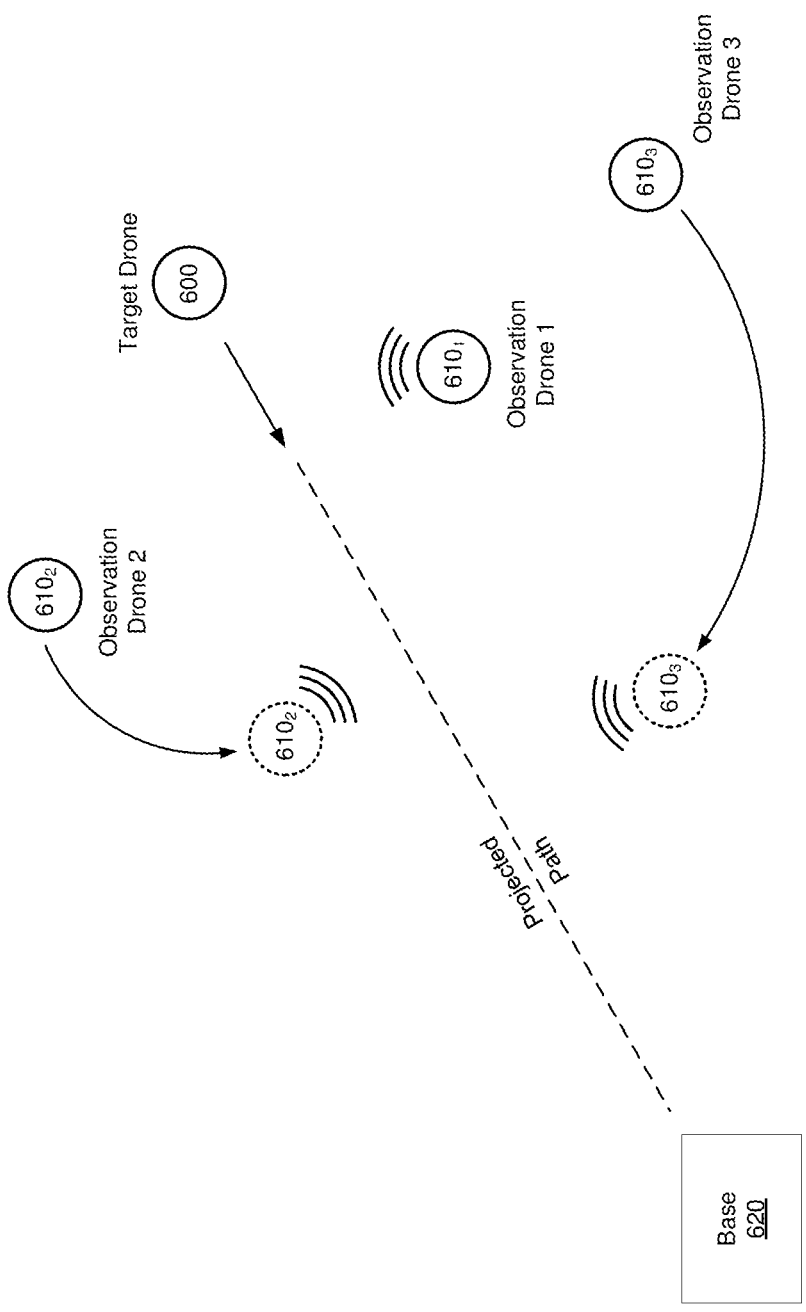
FIG. 6 shows use of multiple radar systems for improving radar angular resolution.

FIG. 6 shows use of multiple radar systems for improving radar angular resolution. Shown in FIG. 6 are drones 600, 6101, 6102, and 6103, each of which is implemented as an aerial drone as described herein, and a base 620.

The drones 600, 6101, 6102, and 6103 are configured for improving radar angular resolution, particularly based on use of multiple radar systems for triangulation. In this regard, each of the drones 600, 6101, 6102, and 6103 may comprise one or more radars for use in conjunction with operations of the drones. As noted, improving radar angular resolution, particularly for radars deployed on relatively small platforms such as drones, is desirable as it allows for compensating for the limitations resulting from small size of the radar that deployment on such platforms necessitates. One mechanism for improving radar angular resolution may entail using multiple radar systems (e.g., radars on multiple drones, such as in a drone swarm) to triangulate on a particular position.

In some instances, such use of multiple radar systems may entail applying advanced computing/processing techniques, such as artificial intelligence (AI) based computing/processing, in multiple mobile platforms. The use of multiple radar systems for triangulating on a particular position may be similar to, and builds on the triangulation based on different observation points as described with respect to FIG. 4, but with use of multiple platforms (e.g., drones) instead of using one platform/drone and moving it around for improved resolution.

For example, in some instances, two or more drones may be used as observation drones, with these drones configured to share their location data (e.g., GPS coordinate information) and ranges to create triangulation capability, particularly for a target drone. The drones may also share their information related to the angle of the target as such information may be used in some use cases. However, while various implementations are described with respect to drones, the disclosure is not so limited, and the platforms and target do not need to be drones. Using two or more observation points (e.g., drones) provides simultaneous or near-simultaneous observation without the need to move a drone for the additional vantage points. The radar observations from the two or more nodes may be simultaneous, or they may be separated in time to allow the two or more radar systems to share the same frequency—that is, use time division multiplexing. Other options for use of multiple coordinated radars, in addition to time division multiplexing, may include frequency separation or frequency division multiplexing, spatial, and coding or modulation multiplexing, polarization multiplexing, and the like. In some instances, a combination of multiplexing techniques may be used. As illustrated in FIG. 6, for example, a first observation drone (drone 6101) that detects the target drone (drone 600) may first notify other drones that may operate as observation drones (drones 6102 and 6103) in the area to perform the search and share the results. In this regard, each observation drone may share an estimated location of the target drone based on the observation drone's location, the detected range, and the area described by the beamwidth or a probable location based on the center of the beam. The disclosure is not limited to target drones, however, and as such in some instances the target may be any of be a variety of non-drone objects. The information for multiple targets can be shared, not just one target. Other drones may then operate their radars in that direction and share the results. The information shared would comprise, e.g., the drone's location, the range to the target, the range and heading, a point-cloud (or xyz) representation, and any combination thereof. One or more of the drones may combine the information shared between nodes in the network to create a more precise location of the target using the combined responses. In some instances, this result may be shared with the other nodes. All of the information (processed and/or raw) may be shared with the local nodes (e.g., drones) and/or may be shared with other nodes, such as ground terminals or sent to the cloud. The local nodes may be connected using a variety of communications means, such as wired if the node is ground based or wireless (e.g., cellular, point-to-point, Wi-Fi, Bluetooth, or other standard, and/or a mesh network) if the node is mobile. As such, information may be shared using available communications networks, mesh communications, etc. The mesh network may be the preferred embodiment. In some instances, data from each drone may comprise the radar data (e.g., radar returns), the position of the drone, and also a timestamp for the time of that return. Such timestamps may be used in the analysis of the target location, and in some instances may be used for other analyses, such as trajectory based on a time sequence of returns, for example. In an example implementation, sharing of information may be used to enable calculation of position and/or trajectory using the combined returns, with such calculation done in, e.g., one of the radar nodes, a separate node, or in the cloud.

In some instances, the drones may share beam steering direction for additional information. The drones may be configured to operate collaboratively similar to the collaborative manner in which drones operate during self-healing functions as described in U.S. patent application Ser. No. 17/326,046, filed on May 20, 2021, which is incorporated herein by reference in its entirety.

In some instances, autonomous operation may be utilized in use of drones in assisting with triangulation. In an example, one drone (e.g., observation drone 6101) detects an object, then autonomously queues other drones (e.g., observation drones 6102 and 6103) for assisting in the triangulation. The autonomous operation may also include optimizing for radar angular resolution—e.g., knowing where the target drone might be and how to guide the drone. In this regard, reinforcement learning (RL) may be utilized in conjunction with optimizing radar angular resolution. The autonomous operation may further include positioning drones as a function of time or target location. For example, target path may be anticipated, and the anticipated target path may be used to get observation drones in place. Target velocity information may be used to anticipate direction. Further, a target (e.g., a particular base or destination) may be anticipated, and the anticipated target used in arranging drones on the path.

Figure 7:
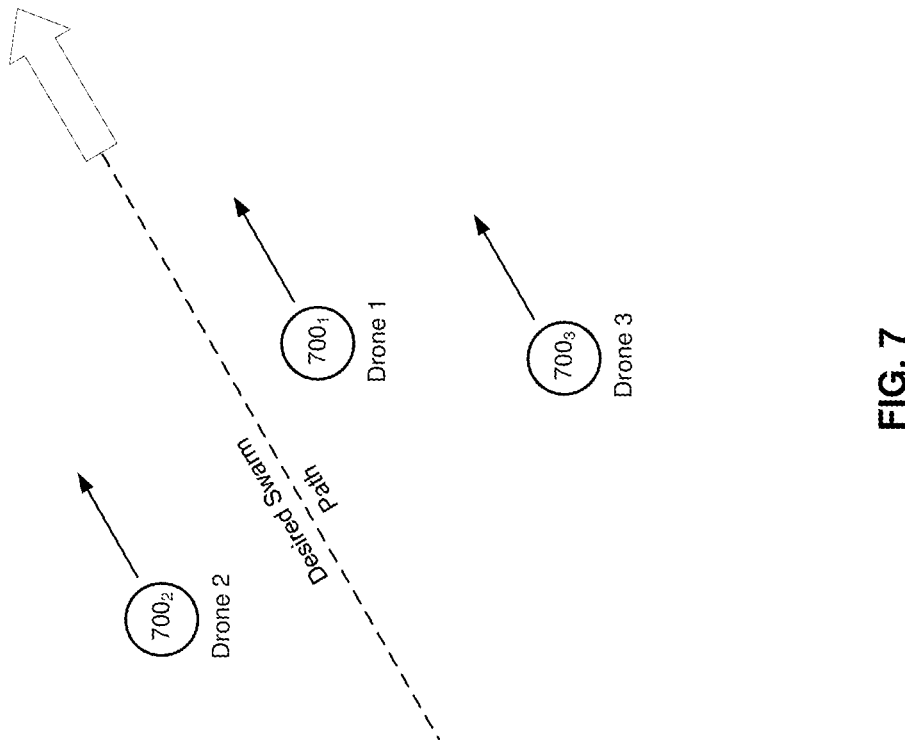
FIG. 7 shows use of multiple drone formations for improving radar angular resolution.

FIG. 7 shows use of multiple drone formations for improving radar angular resolution. Shown in FIG. 7 are drones $700_1$, $700_2$, and $700_3$, each of which implemented as aerial drone as described herein.

The drones $700_1$, $700_2$, and $700_3$ are configured for improving radar angular resolution, particularly based on use of multiple drones flown in formation. In this regard, each of the drones $700_1$, $700_2$, and $700_3$ may comprise one or more radars for use in conjunction with operations of the drones. As noted, improving radar angular resolution, particularly for radars deployed on relatively small platforms such as drones, is desirable as it allows for compensating for the limitations resulting from small size of the radar that deployment on such platforms necessitates. One mechanism for improving radar angular resolution may entail flying multiple drones in formation—that is, 2-dimensional (2D) or 3-dimensional (3D) formation, with the drones arranged specifically such that their radars may collectively provide improved radar resolution.

In this regard, multiple drones (e.g., drones $700_1$, $700_2$, and $700_3$) may be arranged in different 3D positions, with the multiple drones used to locate in X, Y, Z portions. The multiple radar returns of the different radars/drones may be fused together. For example, when using multiple drones are, each drone may detect different target velocities. This information may be used to determine instantaneous location, velocity, and heading (which may be in 3D with multiple drones).

In some instances, multiple drones may be configured to coordinate radar operation, such as to share time/frequency related information, to ensure optimal performance—e.g., to ensure that there are no overlaps or gaps between their radars. For example, spectrum and time may be allocated to different drones for improved overall radar observation time (improved channel capacity).

In some instances, passive detection may be used—e.g., with chirps sent from one drone being sensed by other drone(s). In this regard, particular radar techniques may pose particular challenges when using such passive detection. For example, use of multiple radars in such drone formations may be challenging with frequency-modulated continuous-wave (FMCW) radars, but may be possible by using Orthogonal frequency-division multiplexing (OFDM), especially where the radars/drones are GPS-locked. For example, timestamps may be included in OFDM data and transmitter location data plus system/heartbeat info. The transmitting (TX) drone may include GPS location in the transmitted (TX) data. All drones may be locked to GPS timing and time data would be included in the TX data also. Further, the drones may transmit the beam index or beam pointing angle. Scanning among the drones may be coordinated. For example, pointing angle of the drones may be combined to locate particular targets. This may allow for determining locations of transmitting (TX) drone and receiving (RX) drone (e.g., 2 of the 3 vertices) and additionally determining total time from TX drone to RX drone. In this regard, one TX drone and two RX drones may be needed, or one transmitting/receiving (T/R) drone and one RX drone. With omnidirectional antenna at TX drone or possibly phased array at the TX drone, if in the right direction, the RX drone may be able to identify the direct pulse and the reflected pulse—this may help, especially if the GPS locations of the TX drone and the RX drone are not known. The inverse may also be done—that is, multiple TX drones and one RX drone (especially with multiple frequency). In some instances, time-aligned, distributed FMCW chirp(s) may be used—e.g., with the TX drone and the RX drone starting their chirps at the same time. In aviation based settings, aircraft radar warning systems may use multiple antennas and may assess the amplitude on the various antennas to determine out the angle. In this regard, broad antennas may be sufficient, as they have beams with nice shape (e.g., Gaussian). This may be done using single TX radar and then two RX radars. The phase may also be assessed. The waveform may be changed to get different info—e.g., use continuous wave (CW) signal(s) to gather more precise velocity In some instances, the passive detection may be used to locate other drones in a swarm. For example, in GPS-denied environments, the entire swarm may be locally located as a fixed frame, but may lack global reference. Local geo markers, such as buildings, roads, or other features, may be added in to provide global reference. In partial GPS-denied environment, where one or more drones are GPS-denied (e.g., due to obstructions, such as terrain or buildings), the remaining drones in the swarm that have a GPS fix may provide location to the denied drones.

In some instances, drones may share target information with other drones. For example, the information may include location of drone, angle of return, distance, strength, velocity, etc. This may be particularly useful for detection and avoidance—e.g., cooperative detection and avoidance. These techniques may also be applied to radar used in other platforms or environments, such as boating or aviation. The radars (or combination of radar and communication systems) may be configured to share such information as location and overall radar return with other radars (or radar based systems) in the area. The shared locations and ability to process the related radar returns from various locations/angles may provide a more complete picture. Additional means of detection may be used and combined with the radar—e.g., boats may also include and use sonar.

In some instances, various platform types and combinations thereof, such as drones, robots, ground-based installations, vehicle-based installations, etc., may be used, being configured substantially in similar manner as described herein in conjunction with use of multiple drones.

Figure 8:
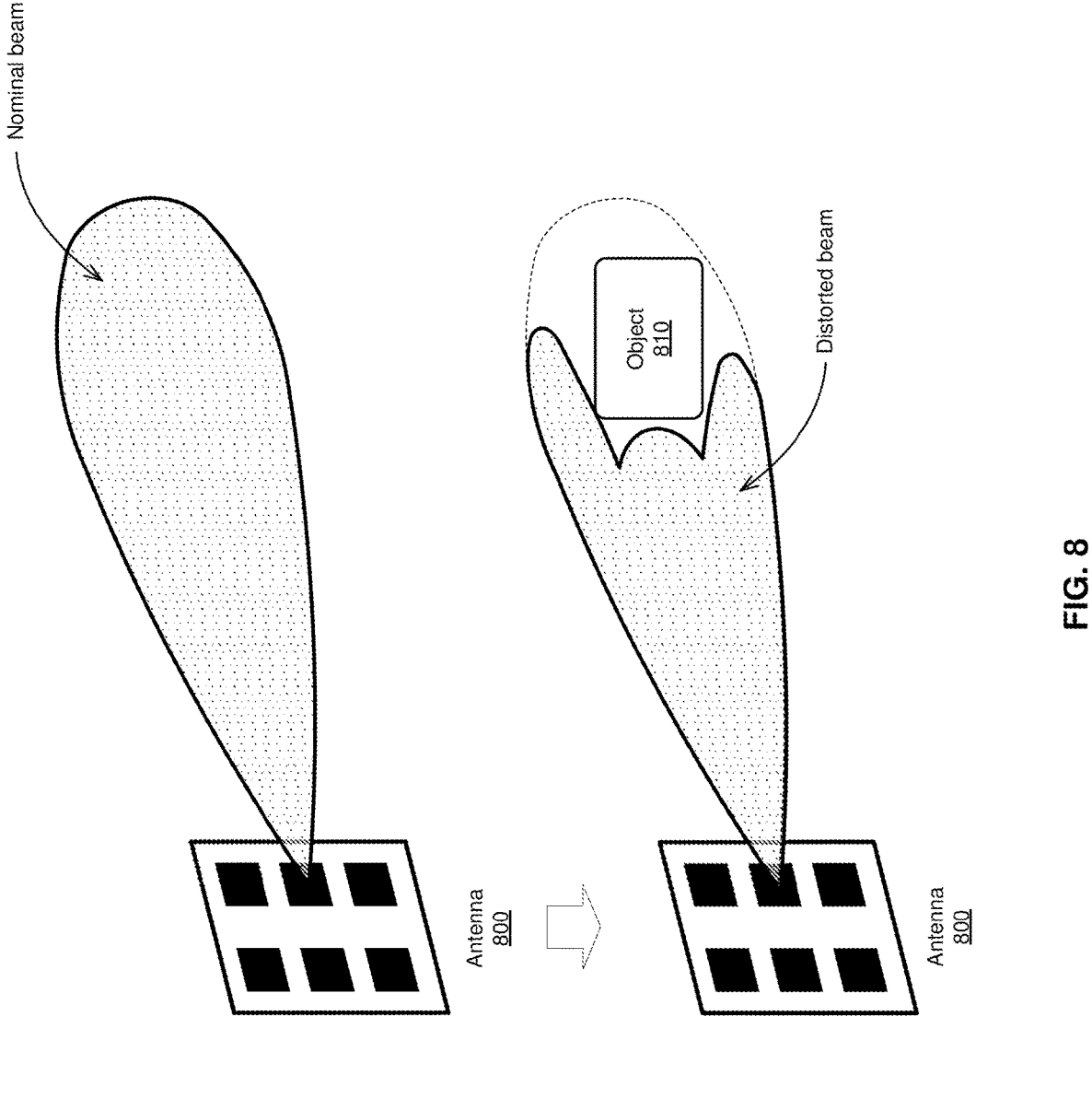
FIG. 8 shows use of a radar system in creating features or distortions of the antenna beam.

FIG. 8 shows use of a radar system in creating features or distortions of the antenna beam. Shown in FIG. 8 is an antenna 800.

The antenna 800 may be implemented in an aerial drone as described herein. The antenna 800 may be implemented or configured to operate as part of or in conjunction with a radar system in the drone. The antenna 800 (and the drone/radar system used in conjunction therewith) is configured for improving radar angular resolution, particularly based on creating features or distortions of the antenna beam.

In various implementations, antennas (and/or radar system used in conjunction therewith) may be configured to create features or distortions of the antenna beam, such as by manipulating operation parameters (e.g., amplitude, phase, etc.) of the antenna. Where phased array antennas are used (as shown in FIG. 8), such manipulating of operation parameters may be done separately and independently for particular element(s) in the phased array. This may result in lower overall gain, but the features may improve radar angular resolution. Notches/cancellation may have a sharper response than summation provides. In an example use scenario (e.g., as illustrated in FIG. 8), the radar may scan across an object 810, and the beam feature may indicate target location. As the beam is scanned in azimuth/elevation, it may be observed that a peak signal level (A) is followed by a reduced signal level (B). The radar may operate such that high gain, wide beamwidth configuration is used for long range scans, and then the antenna pattern is progressively altered (reduce peak gain, add sharp features) as the target gets closer. As such, the antenna may have intentionally distorted or altered patterns. The radar may also be operated to switch between antenna pattern modes. In some instances, compressive reflector or lenses may be used—e.g., including 3D printed lenses and reflectors.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While various spatial and directional terms, such as top, bottom, lower, mid, lateral, horizontal, vertical, front and the like may be used to describe embodiments, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the disclosed technology is not limited in its application to the details of construction and the arrangement of the components set forth in the description or illustrated in the drawings. The technology is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling radar operations utilizing a plurality of nodes, the method comprising:

applying one or more measures for enhancing radar angular resolution for at least one radar deployed on a node of the plurality of nodes;

wherein the one or more measures comprise movement of radar platforms, the radar platforms comprising respective ones of the nodes; and wherein the movement of the radar platforms comprises:
determining a projected path of a detected target; and moving at least a first radar platform comprising a first one of the nodes and a second radar platform comprising a second one of the nodes to respective different positions responsive to determining the projected path of the detected target.

2. The method of claim 1, further comprising, when using movement of radar platforms:

obtaining first radar data from the at least one radar for a target at a first position;

moving the node comprising the at least one radar to a second position that is different from the first position; and obtaining second radar data from the at least one radar for the target at the second position, wherein the first position and the second position are known positions at the time of obtaining the first and second radar data.

3. The method of claim 2, further comprising determining location information of the target based on the first radar data and the second radar data.

4. The method of claim 3, wherein the at least one radar comprises a phased array antenna.

5. The method of claim 4, further comprising adjusting an antenna beam of the phased array antenna based on the determined location information of the target.

6. The method of claim 1, wherein the node of the one or more plurality of nodes is an aerial drone.

7. The method of claim 6, wherein the aerial drone is autonomous.

8. A method for controlling radar operations utilizing two or more nodes, the method comprising:

applying one or more measures for enhancing radar angular resolution for radars deployed on the two or more nodes, each of the two or more nodes comprising at least one radar;

wherein the one or more measures comprise use of the radars deployed on the two or more nodes for triangulation; and wherein use of the radars deployed on the two or more nodes for triangulation comprises:

repositioning the two or more nodes responsive to detection of a target;

obtaining angle information relative to the detected target in each of the two or more nodes utilizing the respective radars deployed thereon; and performing triangulation of the detected target based on the angle information obtained in each of the two or more nodes.

9. The method of claim 8, further comprising, when using the radars deployed on the two or more nodes for triangulation:

obtaining first radar data for a first radar on a first node of the two or more nodes at a first position, and obtaining second radar data for a second radar on a second node of the two or more nodes at a second position;

wherein the first position is different from the second position and the first position and the second position are known positions at the time of obtaining the first and second radar data.

10. The method of claim 9, wherein the first radar and the second radar each comprise a phased array antenna.

11. The method of claim 10, wherein the first node and the second node are aerial drones.

12. The method of claim 11, wherein the aerial drones are autonomous.

13. A method for controlling radar operations in a plurality of nodes, the method comprising:

applying one or more measures for enhancing radar angular resolution for a first radar deployed on a first node of the plurality of nodes, wherein the one or more measures comprise use of the plurality of nodes moving in formation; and wherein use of the plurality of nodes moving in formation comprises:

detecting a target;

determining a desired swarm path based at least in part on the detected target; and moving the plurality of nodes, each comprising at least one corresponding radar, responsive to determining the desired swarm path.

14. The method of claim 13, further comprising, when using the plurality of nodes moving in formation, coordinating radar operation for the first radar deployed on the first node and a second radar deployed on a second node of the plurality of nodes.

15. The method of claim 13, further comprising, when using the plurality of nodes moving in formation, using passive detection via the first radar and a second radar deployed on a second node of the plurality of nodes, wherein the passive detection comprises the first radar detecting radar signals transmitted by the second radar, in addition to the first radar detecting radar signals transmitted by the first radar.

16. The method of claim 13, further comprising, when using the plurality of nodes moving in formation, sharing target information between the first node of the plurality of nodes and a second node of the plurality of nodes.

17. The method of claim 14, wherein the first radar and the second radar each further comprise a phased array antenna.

18. The method of claim 17, wherein the first node and the second node are aerial drones.

19. The method of claim 18, wherein the aerial drones are autonomous.

20. A node configured for operating in a network comprising a plurality of nodes, the node comprising:

a radar configured for detection of objects in a vicinity of the node; and one or more circuits configured to apply one or more measures for enhancing radar angular resolution for the radar;

wherein the one or more measures comprise one or more of: movement of the node and use of multiple nodes moving in formation;

wherein movement of the node comprises movement of the node and one or more additional nodes of the plurality of nodes responsive to determining a projected path of a detected target;

and wherein use of multiple nodes moving in formation comprises determining a desired swarm path based at least in part on a detected target, and moving the plurality of nodes responsive to determining the desired swarm path.

21. The method of claim 1, wherein the radar platforms comprising respective ones of the nodes collectively form at least a portion of a mesh network.

22. The method of claim 1, wherein movement of one or more of the radar platforms is initiated at least in part based on detection of the target.

* * * * *